United States Patent [19]
Sawada et al.

[11] 3,806,611
[45] Apr. 23, 1974

[54] EDIBLE PROTEIN FIBERS

[75] Inventors: Koshichi Sawada, Suita; Shintaro Moritaka, Hyogo; Yukihiro Nakao, Takatsuki; Katsuharu Yasumatsu, Toyonaka, all of Japan

[73] Assignee: Takeda Chemical Industries, Ltd., Osaka, Japan

[22] Filed: Nov. 30, 1971

[21] Appl. No.: 203,447

[30] Foreign Application Priority Data
Dec. 28, 1970 Japan.............................. 45-124075

[52] U.S. Cl. ................................ 426/276, 426/802
[51] Int. Cl. ............................................... A23j 3/00
[58] Field of Search .................. 99/14, 17, 131, 132

[56] References Cited
UNITED STATES PATENTS
3,093,483   6/1963   Ishler et al............................ 99/131
3,455,697   7/1969   Atkinson................................. 99/14
3,645,746   2/1972   Atkinson................................. 99/17

Primary Examiner—A. Louis Monacell
Assistant Examiner—James Robert Hoffman
Attorney, Agent, or Firm—Wenderoth, Lind & Ponack

[57] ABSTRACT

Edible protein fibers are prepared by (1) preparing an alkaline edible protein fiber spinning solution containing protein and a thermo-gelable polysaccharide, (2) extruding the thus-prepared spinning solution through a spinneret into an acid coagulating bath to form protein fibers and (3) neutralizing the excess acid on the filaments. The resulting edible protein fibers are characterized by their soft, smooth texture and white pleasing appearance.

6 Claims, No Drawings

EDIBLE PROTEIN FIBERS

This invention relates to new edible protein fibers having improved qualities and a method of producing them. More particularly, the invention is concerned with edible protein fibers which are produced by using a thermogelable polysaccharide as a raw material therefor.

Recent years have witnessed an increased consumption of, and an increased demand for, edible protein fibers based on vegetable and animal proteins such as soybean protein, wheat gluten, casein and the like, said fibers being generally known as substitute meats.

However, the fibrous products hitherto-available have various drawbacks and are not considered to be generally satisfactory. For example, those fibers are too hard and lack suppleness and, when eaten, given a rather coarse "foreign" mouth-feel. Moreover, they have the disadvantage of being difficult to bite off. For those reasons, the industry demands edible protein fibers having improved qualities.

In view of the foregoing situation, the present inventors conducted an intensive study and found that the use of the thermo-gelable polysaccharide in a specified ratio as a raw material in the method of producing edible protein, solves the above-mentioned various problems in protein fibers.

The thermo-gelable polysaccharide which is used in this invention is a white or off-white powdery substance, with a characteristic absorption band showing the presence of the β-glucosidic bond at 890 cm$^{-1}$ by infrared analysis. In addition, this polysaccharide shows unique behaviors. Thus, it swells on the addition of water thereto and its aqueous suspension whose concentration is not less than 1 percent (weight/volume) is gelled into a jelly or agar-like mass when heated. This change is irreversible, and the properties of the mass are not affected by cooling, nor can it be dissolved in water.

The gel srength of the gel which is obtained by heating a 2 percent aqueous suspension of the thermogelable polysaccharide in boiling water for 10 minutes is between $470 \times 10^3$ to $1300 \times 10^3$ dyne/cm$^2$.

Production of Polysaccharide

The thermo-gelable polysaccharides are, for example, a thermally gelable β-1,3-glucan named "curdlan," a thermogelable β-1,3-glucan-type polysaccharide named "PS". The thermo-gelable polysaccharide is produced by aerobic cultivation of a thermo-gelable polysaccharide-producing microorganism belonging to the genus *Alcaligenes* or *Agrobacterium*.

Curdlan is produced by the cultivation of a mutant (Strain K) of *Alcaligenes faecalis var. myxogenes* 10C3 (See Agricultural Biological Chemistry, Vol. 30, pages 196 et seq. (1966) by Harada et al). PS is produced by the cultivation of a mutant (Strain NTK-u) of the *Alcaligenes faecalis var. myxogenes* Strain K or a strain of *Agrobacterium radiobacter*.

Strain NTK-u was obtained by treating the aboveref ferred Strain K with N-methyl-N'-nitro-N-nitrosoguanidine. Its subculture has been deposited as a specimen at the Institute for Fermentation, Osaka, Japan, under the accession number "IFO-13140" and capable of producing PS-A. The strain of *Agrobacterium radiobacter* is, for example, what is available from the American Type Culture Collection under the accession number ATCC-6466, whose subculture is deposited at the Institute for Fermentation, Osaka, Japan under the accession number of "IFO-13127", and a mutant (Strain u-19) of the Strain IFO-13127, which was obtained from the parent strain by irradiation with ultraviolet rays in a conventional manner.

A subculture of the Strain u-19 has been deposited at the Institute for Fermentation, Osaka, Japan under the accession number of "IFO-13126". Both strains IFO-13127 and IFO-13126 are capable of producing PS-B.

In the present specification, the thermo-gelable polysaccharide may sometimes be described as "polysaccharide".

For the production of the objective polysaccharide, these microorganisms are incubated in a medium which contains assimilable carbon sources (e.g., glucose, sucrose, sorbitol, dextrin, starch hydrolyzates, organic acids) digestible nitrogen sources (e.g., inorganic ammonium salts, nitrates, organic nitrogen sources such as yeast extract, corn steep liquor, corn gluten, soybean meal), inorganic salts (e.g., salts of manganese, iron, magnesium, calcium, zinc and cobalt). If desired, such trace growth promoters as vitaminaceous materials, nucleic acid-related compounds, and so forth, may be incorporated in the culture medium. In the case of cultivating said strain NTK-u, it is necessary to incorporate 50 to 1,000 mcg/ml. of uracil in the medium.

Although the preferred cultural conditions vary with different microorganisms employed, cultivation of the main culture for the production of said polysaccharide is generally effected at a pH of about 5 to 8 at a temperature of 20° to 35°C for 2 to 4 days, using such cultivation means as a shake culture or a submerged culture method.

As the polysaccharide thus produced usually occurs predominantly extracellularly, advantage may be taken, in order to recover it, of a combination of the known techniques for separating and purifying the polysaccharide. By way of illustration, there may be employed such techniques as dissolution, filtration, precipitation (e.g., by neutralization, salting out or the like), desalting (e.g., by permselective dialysis, reverse deionization or the like), liquid-solid separation (e.g., by compression, centrifugation or the like), drying (e.g., by spray drying, lyophilization or the like), powdering etc.

Some examples for the production of polysaccharide are shown below.

EXAMPLE A-1

A loopful of a slant culture of *Agrobacterium radiobacter* (IFO-13127) is inoculated in 30 ml. of an aqueous culture medium charged in a 200ml.-flask, the medium being composed of glucose (5%), $(NH_4)_2HPO_4$ (0.1%), yeast extract (0.5%), $KH_2PO_4$(0.1%), $MgSO_4 \cdot 7H_2O$(0.05%), $FeSO_4 \cdot 7H_2O$(0.005%), $MnSO_4 \cdot 7H_2O$(0.002%), $ZnCl_2$ (0.001%), $CoCl_2$ (0.001%) and water and being adjusted at pH 7.2. Cultivation is effected under shaking at 28°C for 4 days.

The resulting viscous broth is centrifuged at 10,000 rpm. for 20 min. to separate a sediment from the supernatant liquid. To the sediment is added an aqueous 0.5N-NaOH solution, followed by thorough stirring to completely dissolve the polysaccharide portion of the sediment. The solution is then centrifuged again at 10,000 rpm. for 20 min. to remove the cells. The solution is neutralized with a 12 percent aqueous HCl solution, whereupon the desired polysaccharide separates out as a gel. This gel fraction is collected by centrifugation at 2,000 rpm. for 10 min. and washed twice or three times with water, followed by dehydration with acetone and drying, to give 420 mg. of PS-A.

On the other hand, to the supernatant obtained by centrifugation of the culture broth is added its 4-fold volume of acetone. The resulting precipitates are collected and dried to give 120 mg. of polysaccharide PS-A.

Specific rotation:
  $-17°\pm3°$ (C=1.0, dimethylsulfoxide)
  $+33°\pm6°$ (C=1.0, 0.1N-NaOH)
Elementary analysis (%):
  Calculated for $C_6H_{10}O_5$:
    C=44.44: H=6.17
  Found:      C=43.28±1: H=6.20±0.5: N=0.00
Gel strength: $650 \times 10^3$ to $1300 \times 10^3$ dyne/cm².

EXAMPLE A-2

*Alcaligenes faecalis var. myxogenes* Strain NTK-u (IFO-13140) is inoculated in 30 ml. of a seed culture medium charged in a 200 ml. Erlenmyer flask, the medium being composed of glucose (1.0%), $(NH_4)_2HPO_4$ (0.15%), $KH_2PO_4$ (0.1%), $MgSO_4\cdot7H_2O$ (0.05%), $FeSO_4\cdot7H_2O$ (0.005%), $MnSO_4\cdot7H_2O$ (0.002%), $ZnCl_2$ (0.001%), $CoCl_2$ (0.001%), yeast extract (0.1%), $CaCO_3$ (0.3%), uracil (0.01%) and water and being adjusted at pH 7.0. Cultivation is effected under shaking at 32°C for 24 hours.

A 2 ml.-portion of the resultant seed culture broth is inoculated in 20 ml. of a main culture medium charged in a 200 ml.-creased Erlenmyer flask, the medium being composed of glucose (10.0%), $(NH_4)_2HPO_4$ (0.23%), $KH_2PO_4$ (0.1%), $MgSO_4\cdot7H_2O$ (0.05%), $FeSO_4\cdot7H_2O$ (0.005%), $MnSO_4\cdot7H_2O$ (0.002%), $ZnCl_2$ (0.001%), $CoCl_2$ (0.001%), $CaCO_3$ (0.3%), uracil (0.01%) and water and being adjusted at pH 7.0. Cultivation is carried out under shaking at 32°C for 90 hours.

The broths thus obtained in several such flasks are pooled. To 80 ml. of the broth is added 240 ml. of an aqueous 0.5N-NaOH solution, followed by thorough stirring until the produced polysaccharide is swollen. To the mixture is added 160 ml. of water. The diluted solution is centrifuged at 12,000 rpm. for 10 min. to remove the solid matters including the cells. The supernatant liquid is neutralized with a 3N-HCl, whereupon gel sediments separate. The sediments are collected by centrifugation and washed with water until the salts contained therein are removed. Then, the sediments are again centrifuged to collect the desired polysaccharide. Dehydration with acetone and drying under reduced pressure yield 4.4 g. of PS-B. The yield relative to the substrate glucose is 55%.

Specific rotation:
  $-16°\pm3°$ (C=0.5, dimethylsulfoxide)
  $+31°\pm6°$ (C=1.0, 0.1N-NaOH)
Elementary analysis (%):
  Calculated for $C_6H_{10}O_5$:
    C=44.44: H=6.17
  Found       C=43.58±1: H=6.46±0.5: N=0.00
Gel strength:
  $650 \times 10^3$ to $1300 \times 10^3$ dyne/cm²

EXAMPLE A-3

*Alcaligenes faecalis var. myxogenes K* is cultivated in the same manner as in Example A-1 and the resulting broth is centrifuged. To thus obtained sediment is added an aqueous 0.5N-NaOH solution to dissolve the polysaccharide portion of the sediment. The solution is neutralized whereupon polysaccharide "curdlan" separates out.

Specific rotation:
  $-18°$ (0.1N NaOH)
Elementary analysis (%):
  C=43.55: H=6.05: O=48.39
  N and other minor components=2.01
Gel strength: $470 \times 10^3$ to $500 \times 10^3$ dyne/cm²

Production of Edible Fibers

The present inventors have discovered that, in the production of edible protein fibers, high quality edible protein fibers can be produced positively and with good reproducibility by the method of (a) preparing an edible protein fiber spinning solution having a pH value of 9 to 13.5 and containing (1) the protein and (2) the thermogelable polysaccharide in a (1)-to-(2) ratio of 100:1 to 100 (or a weight basis), the combined amount of (1) and (2) being 7 to 20 weight percent relative to the above spinning solution, (b) extruding the spinning solution through a spinneret into an acid coagulating bath thereby coagulating the solution in the form of filaments, (c) neutralizing the same and (d) dehydrating them.

As the protein to be employed as the raw material in the method of this invention, such proteins as soybean protein, peanut protein, casein, and the like, can be generally used to advantage. Aside from those materials, other vegetable proteins, animal proteins such as fish flesh, proteins obtainable by the cultivation of microorganisms including the so-called petroleum proteins may also be effectively utilized. Any protein can be employed as long as it is hygienically acceptable for human beings and is available at reasonable cost and in large quantities.

Production of the Spinning Solution

The spinning solution can be obtained, for example by the steps of blending the aforesaid polysaccharide with a protein material in a protein-to-polysaccharide ratio of 100:1 to 100 (weight basis), evenly dissolving the blend in an aqueous solution of an alkaline substance such as sodium hydroxide to prepare an alkali-solubilized solution having a pH value of 9 to 13.5 and containing protein and polysaccharide in a total combined proportion of 7 to 20 weight percent and aging the thus-solubilized solution; or by the steps of preparing an alkali-solubilized solution of a selected protein and, then, adding a suitable amount of the polysaccharide to this solution and aging the thus obtained solution; or by the steps of preparing an alkali-solubilized solution of a selected protein and aging the alkali-solubilized solution and, then adding an alkaline solution of the polysaccharide, which is separately prepared, to the above aged protein solution under uniform stirring.

The protein to be utilized in accordance with this invention is sufficiently solubilized under the above defined pH range and subsequent aging to become spinnable. However, excessive aging of the solubilized protein results in a viscosity which does not lend itself well to spinning. On the other hand, the aforementioned polysaccharide used in the present invention is stable in quality and, unlike proteins, does not undergo a viscosity change upon standing in alkaline solution.

Therefore, the incorporation of the poylsaccharide may be effected at substantially any opportune time.

The protein and polysaccharide in the alkali-solubilized solution (or in the spinning solution) are contained in the above-indicated proportions and in the above-indicated range. For example, when the ratio of polysaccharide to protein is below the indicated range, the object of improving the qualities of the edible protein fibers will not be accomplished, and when the ratio is higher than the above range, the properties required of edible protein fibers are lost. However, since those various conditions are intimately correlated, the condition should be suitably combined within the scope of the above-indicated conditions.

For instance, when the ratio of polysaccharide to protein is high, it is desirable that the combined concentration of protein and polysaccharide in the alkali-solubilized solution is lowered or the concentration of alkali is increased to raise the pH of the solution. In addition, different proteins, e.g. soybean protein and casein, reacts differently to alkali. Thus, when soybean protein is used as the protein, the suitable pH range of spinning solution is 11.5 to 13.5, while the range of pH 9 to 11 is suitable when casein is employed.

When vegetable proteins such as soybean protein and peanut protein are employed as the protein, it is advantageous to select native defatted soyflour. As will be seen from Experiment 1 and Example 1, which appear hereinafter, satisfactory protein fibers can be produced according to this invention when the extracted powders are subjected to the following pretreatment. Thus, water is added to such defatted flour and the system is warmed to a temperature of about 40°C to obtain a protein extract, which is then adjusted to pH about 4.5 by the addition of an acid. The resulting acid-precipitated protein curd having a moisture content of about 66 percent is diluted with water to obtain a homogeneous slurry.

When acid casein is used as the protein, it need not be subjected to such a pretreatment but can be directly employed.

While the alkali concentration of the above-mentioned alkali-solubilized solution is preferably in the range of pH 9 to pH 13.5, care is needed since, as aforesaid, the proper pH range differs slightly with different kinds of proteins. As the aqueous alkali solution, use is generally made of a 10 percent aqueous solution of sodium hydroxide, though other alkaline substances such as calcium hydroxide may also be employed.

Aging may be effected by allowing the alkali-solubilized solution to stand at a liquid temperature of about 40°C for 20 to 60 min., with gentle stirring when necessary. The solution is then preferably defoamed sufficiently free of bubbles.

With regard to the acid coagulating bath to be employed in this invention, use may be made of such inorganic or organic acids as acetic acid, hydrochloric acid, sulfuric acid, etc. and those acids are preferably used as an aqueous solution (pH about 4 and below) of 0.5 to 15 percent concentration. Improved spinnability can be realized by increasing the concentration of acid in the above range. The addition of 5 to 35 weight percent of a salt to the acid coagulating bath is desirable, for it will generally enhance the coagulating ability of the spinning solution.

While sodium chloride is generally used for this purpose, such other salts as calcium chloride and magnesium chloride may also be employed.

To extrude the spinning solution into filaments, it may be continuously extruded through spinneret orifices, e.g. about 0.05 to 0.3 mm. in diameter, into the coagulating bath in the routine manner.

The filaments thus obtained are dipped in an aqueous solution of alkali such as sodium bicarbonate and sodium carbonate to neutralize the excess acid on the filaments. This neutralization is generally carried out to pH about 4 – 7, preferably to pH about 5.5 when soybean protein is employed as the protein, and to pH about 5.0 when casein is employed. Then the neutralized filaments are washed thoroughly with water and dehydrated or dried, whereupon the desired protein fibers are obtained.

Usually, the fibers dehydrated to a moisture content of 60 to 70 weight percent are employed, and to prevent putrefaction, the fibers are stored in a refrigerator or frozen.

The edible protein fibers obtainable according to this invention have improved qualities and, by virtue of their soft, tenacious, smooth mouth-feel and white, satisfactory appearance, are of considerable value to the industry.

As shown in Experiments 1 and 2, tests were carried out by incorporating shortening, starch, casein and gelatin, in place of the polysaccharide, in soybean protein, but the results clearly indicate that those products are inferior to the product obtained by the use of the polysaccharide. (See Tables 1 and 2.)

The edible protein fibers obtainable according to this invention can be processed into simulate meats and meat-like processed foods such as ham, sausage, corned beef, hamburg steak, etc., with binders, flavoring agents, oils, fats and the like.

The binder preferably consists of a heat coagulable protein such as albumen. Various flavoring agents having beef and other meat flavors may be incorporated in the products. Fats and oils originated from vegetables and animals may also be incorporated. The said materials may be incorporated in a routine manner to obtain the objective edible foods.

This invention will be further illustrated by the following experiments and examples.

EXPERIMENT 1

(1) Testing Procedure

To 5 kg. of native defatted soyflour is added 50 kg. of water and the mixture is stirred at a constant liquid temperature of 40°C for 1 hour. The mixture is centrifuged to obtain a soybean protein extract. The extract is adjusted to pH 4.5 with hydrochloric acid and the resulting precipitate is collected by centrifugation to obtain 4.5 kg. of acid-precipitated soybean protein curd having a moisture content of 65 percent. Then, the additives indicated in Table 1 are added to aliquot portions of the above soybean protein curd in the protein-additive ratio of 13:1 (weight basis). After the addition of water, each mixture is evenly stirred in a homogenizer to prepare a slurry sample. To each of those slurries, a 10 percent aqueous solution of sodium hydroxide is added, followed by stirring to homogeniety. The procedure yields various alkali-solubilized solution samples, each having a pH of 12.3 and a combined soybeam protein-additive concentration of 14 weight percent. Each sample solution is aged under gentle stirring at 40°C for 20 min. and defoamed free of bubbles, whereupon a spinning solution is obtained. This spinning solution is extruded through a spinneret having orifices 0.12 mm in diameter into a coagulating bath comprising a 3 percent aqueous solution of acetic acid containing 10 percent of sodium chloride, whereupon the solution is coagulated in the form of filaments. The acid-coagulated protein filaments are neutralized to a pH of 5.5 by immersing them in an aqueous solution of sodium bicarbonate, washing the filaments thoroughly with water and dehydrating the filaments by squeezing over rubber rollers.

A sensory test was made on the resulting edible protein fibers by the scoring method (on a 5-point grade) using a panel of 20 experts.

The hardness of each sample was measured with a texturometer.

(2) Test Results

The results of the above test are set forth in Table 1. The advantage of the method of this invention is at once apparent. Thus, compared with the control samples, the edible protein fibers according to this invention have excellent qualities, including soft tenacious mouth-feel and ease of biting off.

It has also been found that the appearance of those fibers is somewhat whiter than the controls.

EXPERIMENT 2

1. Testing Procedure

Using the soybean protein fibers prepared in Experiment 1, meat-like processed foods are prepared according to the formulation set out below, and a sensory test is carried out using a panel of 20 experts.

Thus, 60 g. of shortening, 200 g. of water, 50 g. of dried egg white, 25 g. of soybean protein, 15 g. of sodium chloride and 5 g. of sucrose are sufficiently blended and dispersed in a homo-mixer.

To 1 part (by weight basis) each of aliquots of the resulting dispersion, 1 part of each of the soybean protein fiber samples (dehydrated, undried samples) indicated in the following table is added.

After thorough admixing, each mixture is filled into polyvinylidene chloride casings 4.5 cm in diameter.

After sealing, the casings are heated in boiling water for 50 min. to prepare processed food samples having eating qualities similar to those of animal meats.

2. Test Results

The results of the above test are set forth in Table 2. It is apparent that the processed food containing the edible protein fibers of this invention is the most desired of all.

Table 2

| No. | Type of additive, incorporated in protein fibers | Sensory test scores | | | Texturometer hardness (texturo units) |
|---|---|---|---|---|---|
| | | Hardness | Difficulty to bite off | Desirability as meat-like food | |
| 1 | None | 3.9 | 4.1 | 1.9 | 13.0 |
| 2 | Polysaccharide PS-B | 2.8* | 2.1** | 3.3* | 9.1 |
| 3 | Shortening | 3.7 | 3.8 | 1.9 | 12.5 |
| 4 | Starch | 3.5 | 3.0 | 2.3 | 11.8 |
| 5 | Casein | 3.8 | 3.9 | 2.1 | 12.9 |
| 6 | Gelatin | 3.5 | 3.2 | 2.0 | 12.6 |

(Note) 1. The sensory test is carried out by the scoring method on a 5-point scale. For hardness, a higher value represents an increased degree of hardness; for difficulty to bite off, a higher value represents an increased difficulty to bite off; and for desirability as meat-like food, a higher value means that the corresponding sample is more desirable.
2. ** and * denote that the corresponding samples are significantly different from the control (with no additive) at the levels of significance of 1% and 5%, respectively.

EXPERIMENT 3

1. Testing Procedure

The soybean protein curd obtained by the procedure

Table 1

| No. | Additive | Sensory test scores | | | | Texturometer hardness (texturo-units) |
|---|---|---|---|---|---|---|
| | | Hardness | Difficulty to bite off | Smoothness | Whiteness | |
| 1 | None | 3.8 | 3.5 | 1.9 | 3.7 | 7.5 |
| 2 | Polysaccharide PS-B | 2.1** | 2.3** | 3.0* | 3.3 | 5.6 |
| 3 | Shortening | 3.3 | 3.1 | 2.4 | 3.6 | 6.9 |
| 4 | Starch | 3.1 | 3.0 | 2.2 | 3.2 | 6.8 |
| 5 | Casein | 3.9 | 3.7 | 2.0 | 3.1 | 7.4 |
| 6 | Gelatin | 3.3 | 3.3 | 2.3 | 3.3 | 6.8 |

(Note) 1. The sensory test is carried out using the scoring method on a five-point grade. For hardness, a higher value represents an increased degree of hardness; for difficulty to bite off, a higher value represents an increased difficulty to bite off; for smoothness, a higher value represents an increased degree of smoothness; and for whiteness, a higher value means that the sample is nearer to black.
2. ** Means that the sample is significantly different from the control (the sample with no additive) at the 1% level of significance. *Has a similar meaning except that the level of significance is 5%.

of Experiment 1 and casein are used as the protein and, after the addition of water, protein fiber samples are prepared under the manufacturing conditions set forth in Table 3. Thus, to each protein material, a predetermined amount of the polysaccharide powder is added and, after thorough stirring and blending in a homomixer, a 10% aqueous solution of sodium hydroxide is added. The mixture is uniformly stirred to effect an alkali solubilization of the protein and allowed to stand at a liquid temperature of 40°C for 30 min. The thus-aged solution is sufficiently defoamed to obtain a spinning solution. This solution is extruded through a spinneret having orifices 0.1 mm in diameter into an acid coagulating bath, whereupon the solution is coagulated into filaments. The filaments are neutralized by dipping in an aqueous solution of sodium bicarbonate, washed thoroughly with water and dehydrated. The procedure yields an edible protein fiber sample (undried sample). The neutralization of filaments is effected to pH 5.5 when the protein is soybean protein and to pH 5 when casein is employed. (A 0.15% aqueous solution of sodium bicarbonate is used.)

A sensory test is carried out on those samples using a panel of 20 experts.

2. Test Results

The result of the above test are set forth in Table 3.

The advantage of the edible protein fibers according to this invention is at once apparent. As regards the pH of spinning solutions, the range of pH 11.5 to pH 13.5 is preferred when soybean protein is used as the protein, while the range of pH 9 to pH 11 is desirable when casein is employed.

Table 3

| No. | Concentrations in each spinning solution (% by weight) | | | Ratio of polysaccharide PS-B to soybean protein (weight %) | pH of each spinning solution |
|---|---|---|---|---|---|
|  | Soybean protein | Polysaccharide PS-B | Total |  |  |
| 1 | 3.1 | 2.9 | 6.0 | 100 | 11.3 |
| 2 | 3.5 | 3.5 | 7.0 | 100 | 11.1 |
| 3 | 3.5 | 3.5 | 7.0 | 100 | 11.5 |
| 4 | 3.5 | 5.0 | 8.5 | 142.9 | 12.5 |
| 5 | 13.5 | 0 | 13.0 | 0 | 12.0 |
| 6 | 13.0 | 0.05 | 13.05 | 0.4 | 12.0 |
| 7 | 13.0 | 0.12 | 13.12 | 1.0 | 12.2 |
| 8 | 13.0 | 1.0 | 14.0 | 7.7 | 12.5 |
| 9 | 8.5 | 5.0 | 13.5 | 58.8 | 13.3 |
| 10 | 15.1 | 2.0 | 17.1 | 13.3 | 12.9 |
| 11 | 18.0 | 2.0 | 20.0 | 11.5 | 13.5 |
| 12 | 18.0 | 2.0 | 20.0 | 11.5 | 13.9 |
| 13 | 18.5 | 3.4 | 21.9 | 18.4 | 13.4 |
| 14 | Casein 14.0 | 0.5 | 16.5 | 31.3 | 9.0 |
| 15 | Casein 14.0 | 0.5 | 16.5 | 31.3 | 7.5 |
| 16 | Casein 14.0 | 0.5 | 16.5 | 31.3 | 11.2 |

| No. | Spinnability of each spinning solution | | Composition of acid coagulating bath | Properties of resulting edible protein fibers | |
|---|---|---|---|---|---|
|  | Judgement | Findings |  | Judgement | Properties |
| 1 | — | Viscosity too low; unspinnable | Acetic acid 4% Sodium chloride 25% |  |  |
| 2 | — | Gel; hardly spinnable | do. |  |  |
| 3 | + | Viscous liquid; good spinnability | do. | ++ | Soft and easy to bite off; satisfactory |
| 4 | + | do. | Acetic acid 5% Sodium chloride 25% | — | Soft, but lacking in the mouth-feel characteristic of protein fiber |
| 5 | + | do. | Acetic acid 3% Sodium chloride 10% | — | Hard and difficult to bite off; unsatisfactory |
| 6 | + | Viscous liquid, good spinnability | Acetic acid 3% Sodium chloride 10% | ± | Softer than No.5, but still unsatisfactory |
| 7 | + | do. | do. | + | Rather soft and easy to bite off; satisfactory |
| 8 | + | Viscous liquid, good spinnability | Acetic acid 3% Sodium chloride 10% | ++ | Soft and easy to bite off; satisfactory |
| 9 | + | Viscous liquid, good spinnability | Acetic acid 4% Sodium chloride 10% | ++ | Soft and easy to bite off; satisfactory |
| 10 | + | do. | Acetic acid 3% Sodium chloride 10% | ++ | Soft and easy to bite off; satisfactory |
| 11 | + | do. | do. | ++ | do. |
| 12 | — | Insufficient viscosity; difficult to spin | Acetic acid 3% Sodium chloride 10% |  |  |
| 13 | — | Gel; unspinnable | do. |  |  |

| No. | Spinnability of each spinning solution | | Composition of acid coagulating bath | Properties of resulting edible protein fibers | |
|---|---|---|---|---|---|
| | Judgement | Findings | | Judgement | Properties |
| 14 | + | Viscous liquid; good spinnability | Acetic acid 10% Sodium chloride 10% | + | Soft and easy to bite off; satisfactory |
| 15 | − | Gel; difficult to spin | do. | | |
| 16 | − | Insufficient viscosity; difficult to spin | do. | | |

(Note) In samples No. 14 through 16, casein is used in place of soybean protein. In the above Experiments 1 to 3, similar results were obtained by using polysaccharide PS-A instead of PS-B.

EXAMPLE 1

To 10 kg. of native defatted soyflour is added 100 kg. of water, and the mixture is stirred at a liquid temperature of 40°C for 1 hour. Removal of solids leaves a protein extract. This extract is adjusted to pH 4.5 with 10 percent hydrochloric acid and the resulting precipitate is collected by centrifugation and, for washing purposes, is dispersed in water and centrifuged a second time, whereupon 8 kg. of acidprecipitated curd having a moisture content of 66 percent is obtained. To this curd, 8.9 kg. of water and 0.25 kg. of the polysaccharide PS-B are added and the mixture is stirred in a homomixer to obtain an even slurry. To this slurry is added 2.3 kg. of a 10 percent aqueous solution of sodium hydroxide to prepare an alkali-solubilized solution having a pH of 12. Under gentle stirring, the solution is held at a liquid temperature of 40°C for 20 min. and the thus-aged solution is defoamed in the conventional manner. The above procedure yields a spinning solution having a spinnable viscosity. This spinning solution is extruded through a spinneret having orifices 0.1 mm in diameter into an acid-salt coagulating bath containing 3 percent acetic acid and 12 percent sodium chloride. The acid-coagulated protein fibers are neutralized by dipping in a 0.4 percent solution of sodium bicarbonate until a pH value of 5.3 is reached and, after thorough washing with water, dehydrated by squeezing over rubber rollers. The above procedure yields 6.5 kg. of edible protein fibers having a moisture content of 62 percent.

Either as such or after heating under sealed conditions, the above edible protein fibers give a soft, tenacious, smooth mouth-feel, are easy to bite off and have a satisfactory appearance.

EXAMPLE 2

To 5 kg. of acid casein is added 17.5 kg. of water and the mixture is stirred in a homo-mixer to obtain a homogeneous casein dispersion. To this dispersion is added 1.6 kg. of a 10 percent aqueous solution of sodium hydroxide and the mixture is stirred gently to prepare an alkali-solubilized solution. The solution is allowed to stand at a liquid temperature of 40°C for 20 min., whereby it is aged. Separately, 5.2 kg. of water is added to 0.3 kg. of the indicated polysaccharide PS-B and the mixture is stirred in a homo-mixer to obtain a homogeneous polysaccharide PS-B dispersion. To this dispersion is added 0.5 kg. of a 10 percent aqueous solution of sodium hydroxide and the mixture is stirred gently, whereupon an alkaline solution of the polysaccharide PS-B is obtained. This alkaline polysaccharide PS-B solution is added to the aged casein solution prepared above and the mixture is evenly stirred and defoamed. The above procedure gives a spinning solution having a pH of 10. This spinning solution is extruded through a spinneret having orifices 0.12 mm in diameter into an acid-salt coagulating bath (aqueous solution) containing 10 percent acetic acid and 10 percent sodium chloride, and the resulting tow is neutralized to pH 5 by dipping in a 0.15 percent aqueous solution of sodium bicarbonate. The tow is thoroughly washed with water and dehydrated by squeezing over rubber rollers. The procedure yields 10.5 kg. of edible protein fibers having a moisture content of 60 percent.

Either as such or after heating under sealed conditions, the above protein fibers give a soft, tenacious, smooth mouthfeel, are easy to bite and have a white, acceptable appearance.

EXAMPLE 3

To 5 kg. of acid casein are added 22.7 kg. of water and 0.3 kg. of polysaccharide PS-A and the mixture is stirred in a homo-mixer to obtain a homogeneous dispersion. To this dispersion is added 2.1 kg. of a 10 percent aqueous solution of sodium hydroxide and the mixture is stirred gently to prepare an alkali-solubilized solution. The solution is allowed to stand at a liquid temperature of 40°C for 20 min., whereby it is aged and then defoamed. The above procedure gives a spinning solution having a pH of 10. This spinning solution is extruded through a spinneret having orifices 0.12 mm. in diameter into an acid-salt coagulating bath containing 10 percent acetic acid and 10 percent sodium chloride, and the resulting tow is neutralized to pH 5 by dipping in a 0.15 percent aqueous solution of sodium bicarbonate.

The tow is thoroughly washed with water and dehydrated by squeezing over rubber rollers. The procedure yields 10.5 kg. of edible protein fibers having a moisture content of 60 percent.

EXAMPLE 4

To 10 kg. of native defatted soyflour is added 100 kg. of water, and the mixture is stirred at a liquid temperature of 40°C for 1 hour. Removal of solids leaves a protein extract. This extract is adjusted to pH 4.5 with 10 percent hydrochloric acid and the resulting precipitate is collected by centrifugation and, for washing purposes, is dispersed in water and centrifuged a second time, whereupon 8.5 kg. of acid-precipitated curd having a moisture content of 64 percent is obtained. To this curd, 13.4 kg. of water and 0.4 kg. of the polysaccharide curdlan are added and the mixture is stirred in a homo-mixer to obtain an even slurry. To this slurry is added 2.5 kg. of a 10% aqueous solution of sodium hydroxide to prepare an alkali-solubilized solution. The solution is allowed to stand at a liquid temperature of 40°C for 20 min. and the thus-aged solution is defoamed in the conventional manner. The above procedure yields a spinning solution having a spinnable viscosity. This spinning solution is extruded through a spinneret having orifices 0.12 mm in diameter into an acid-salt coagulating bath containing 3 percent acetic acid and 12 percent sodium chloride. The acid-coagulated protein fibers are neutralized by dipping in a 0.4 percent aqueous solution of sodium bicarbonate until a pH value of 5.5 is reached and, after thorough washing with water, dehydrated by squeezing over rubber rollers. The above procedure yields 8 kg. of edible protein fibers having a moisture content of 67 percent.

Either as such or after heating under sealed conditions, the above edible protein fibers give a soft, tenacious, smooth mouth-feel, are easy to bite off and have a satisfactory appearance.

What we claim is:

1. A method for preparing edible protein fibers having improved qualities, which comprises (1) preparing an alkaline edible protein fiber spinning solution containing (a) protein and (b) a thermo-gelable polysaccharide produced by aerobic cultivation of a thermo-gelable polysaccharide-producing microorganism of the genus Alcaligenes or Agrobacterium in (a) to (b) ratio of 100 : 1 to 100, on a weight basis, (2) aging the alkaline edible protein fiber spinning solution, (3) extruding the thus prepared spinning solution through a spinneret into an acid coagulating bath to form protein fibers, (4) neutralizing the excess acid on the fibers, and (5) dehydrating the formed fibers.

2. The method according to claim 1, wherein the alkaline edible protein fiber spinning solution contains a solution having a pH value of 9 to 13.5 and containing (1) the protein and (2) the thermo-gelable polysaccharide in a (1) to (2) ratio of 100:1 to 100(in weight basis) and in a combined amount of (1) and (2) of 7 to 20 weight percent.

3. The method according to claim 1, wherein the protein contains soybean protein and casein.

4. A method according to claim 1 wherein the aging is performed at about 40°C for 20 to 60 minutes.

5. A method according to claim 1 wherein the dehydration is performed by squeezing to a moisture content of 60 to 70 weight percent.

6. A method according to claim 1 wherein the thermogellable polysaccharide is produced by:

a. cultivation of *Alcaligenes faecalis* var. myxogenes Strain K (IFO-13140) in a medium containing assimilable carbon and nitrogen sources and uracil or b. cultivation of *Agrobacterium radiobacter* (IFO-13126) or (IFO-13127) in a medium containing assimilable carbon and nitrogen sources.

* * * * *